United States Patent
Cheng et al.

[11] Patent Number: 5,853,943
[45] Date of Patent: Dec. 29, 1998

[54] TONER PROCESSES

[75] Inventors: Chieh-Min Cheng, Rochester; Grazyna E. Kmiecik-Lawrynowicz, Fairport, both of N.Y.

[73] Assignee: Xerox Corporation, Stamford, Conn.

[21] Appl. No.: 5,420

[22] Filed: Jan. 9, 1998

[51] Int. Cl.$^6$ .................................................. G03G 9/087
[52] U.S. Cl. .......................................................... 430/137
[58] Field of Search ............................................. 430/137

[56] References Cited

U.S. PATENT DOCUMENTS

| | | |
|---|---|---|
| 3,590,000 | 6/1971 | Palermiti et al. . |
| 3,655,374 | 4/1972 | Palermiti et al. . |
| 3,674,736 | 7/1972 | Lerman et al. . |
| 3,720,617 | 3/1973 | Chatterji et al. . |
| 3,944,493 | 3/1976 | Jadwin et al. . |
| 3,983,045 | 9/1976 | Jugle et al. . |
| 4,007,293 | 2/1977 | Mincer et al. . |
| 4,079,014 | 3/1978 | Burness et al. . |
| 4,137,188 | 1/1979 | Uetake et al. ........................ 430/106.6 |
| 4,265,990 | 5/1981 | Stolka et al. ............................... 430/59 |
| 4,394,430 | 7/1983 | Jadwin et al. ............................ 430/110 |
| 4,558,108 | 12/1985 | Alexandru et al. ...................... 526/340 |
| 4,560,635 | 12/1985 | Hoffend et al. ...................... 430/106.6 |
| 4,563,408 | 1/1986 | Lin et al. ................................... 430/59 |
| 4,585,884 | 4/1986 | Lin et al. ................................. 556/413 |
| 4,797,339 | 1/1989 | Maruyama et al. ..................... 430/109 |
| 4,935,326 | 6/1990 | Creatura et al. ........................ 430/108 |
| 4,937,166 | 6/1990 | Creatura et al. ........................ 430/108 |
| 4,983,488 | 1/1991 | Tan et al. ................................. 430/137 |
| 4,996,127 | 2/1991 | Hasegawa et al. ...................... 430/109 |
| 5,066,560 | 11/1991 | Tan et al. ................................. 430/137 |
| 5,278,020 | 1/1994 | Grushkin et al. ....................... 430/137 |
| 5,290,654 | 3/1994 | Sacripante et al. ..................... 430/137 |
| 5,308,734 | 5/1994 | Sacripante et al. ..................... 430/137 |
| 5,344,738 | 9/1994 | Kmiecik-Lawrynowicz et al. . 430/137 |
| 5,346,797 | 9/1994 | Kmiecik-Lawrynowicz et al. . 430/137 |
| 5,348,832 | 9/1994 | Sacripante et al. ..................... 430/109 |
| 5,364,729 | 11/1994 | Kmiecik-Lawrynowicz et al. . 430/137 |
| 5,366,841 | 11/1994 | Patel et al. .............................. 430/137 |
| 5,370,963 | 12/1994 | Patel et al. .............................. 430/137 |
| 5,403,693 | 4/1995 | Patel et al. .............................. 430/137 |
| 5,405,728 | 4/1995 | Hopper et al. .......................... 430/137 |
| 5,418,108 | 5/1995 | Kmiecik-Lawrynowicz et al. . 430/137 |
| 5,444,140 | 8/1995 | Paine et al. ............................. 430/137 |
| 5,455,315 | 10/1995 | Paine et al. ............................. 430/137 |
| 5,496,676 | 3/1996 | Croucher et al. ....................... 430/137 |
| 5,501,935 | 3/1996 | Patel et al. .............................. 430/137 |
| 5,527,658 | 6/1996 | Hopper et al. .......................... 430/137 |
| 5,561,025 | 10/1996 | Torres et al. ............................ 430/137 |
| 5,585,215 | 12/1996 | Ong et al. ............................... 430/107 |
| 5,650,255 | 7/1997 | Ng et al. ................................. 430/137 |
| 5,650,256 | 7/1997 | Veregin et al. ......................... 430/137 |

*Primary Examiner*—Roland Martin
*Attorney, Agent, or Firm*—E. O. Palazzo

[57] ABSTRACT

A process for the preparation of a latex comprising the polymerization of monomer in the presence of a chain transfer component, an initiator, a diphenyloxide disulfonate, and an optional nonionic surfactant.

12 Claims, No Drawings

TONER PROCESSES

PENDING APPLICATIONS

Illustrated in copending applications, the disclosures of which are totally incorporated herein by reference, U.S. Ser. No. 960,754 pending are cleavable surfactants; U.S. Pat. No. 5,766,818 is emulsion/aggregation with cleavable surfactants; U.S. Ser. No. 959,798 pending is emulsion/aggregation with water miscible chain transfer agents; U.S. Pat. No. 5,766,817 is emulsion/aggregation with miniemulsion; and U.S. Ser. No. 005,281 pending, there are illustrated processes for the preparation of toner wherein a reactive surfactant is selected.

The appropriate components and processes of these copending applications may be selected for the present invention in embodiments thereof.

BACKGROUND OF THE INVENTION

The present invention is generally directed to toner processes, and more specifically, to processes which utilize aggregation and coalescence or fusion of the latex, colorant, such as pigment, dye, or mixtures thereof, and optional additive particles.

PRIOR ART

There is illustrated in U.S. Pat. No. 4,996,127 a toner of associated particles of secondary particles comprising primary particles of a polymer having acidic or basic polar groups and a coloring agent. The polymers selected for the toners of the '127 patent can be prepared by an emulsion polymerization method, see for example columns 4 and 5 of this patent. In column 7 of this '127 patent, it is indicated that the toner can be prepared by mixing the required amount of coloring agent and optional charge additive with an emulsion of the polymer having an acidic or basic polar group obtained by emulsion polymerization. In U.S. Pat. No. 4,983,488, there is disclosed a process for the preparation of toners by the polymerization of a polymerizable monomer dispersed by emulsification in the presence of a colorant and/or a magnetic powder to prepare a principal resin component and then effecting coagulation of the resulting polymerization liquid in such a manner that the particles in the liquid after coagulation have diameters suitable for a toner. It is indicated in column 9 of this patent that coagulated particles of 1 to 100, and particularly 3 to 70, are obtained. This process is thus directed to the use of coagulants, such as inorganic magnesium sulfate, which results in the formation of particles with a wide particle size distribution. Similarly, the aforementioned disadvantages, for example poor particle size distributions, are obtained hence classification is required resulting in low toner yields, are illustrated in other prior art, such as U.S. Pat. No. 4,797,339, wherein there is disclosed a process for the preparation of toners by resin emulsion polymerization, wherein similar to the '127 patent certain polar resins are selected, and wherein flocculation as in the present invention is not believed to be disclosed; and U.S. Pat. No. 4,558,108, wherein there is disclosed a process for the preparation of a copolymer of styrene and butadiene by specific suspension polymerization.

In U.S. Pat. No. 5,561,025, the disclosure of which is totally incorporated herein by reference, there is illustrated emulsion/aggregation/coalescence processes wherein water phase termination agents are selected.

Other prior art that may be of interest includes U.S. Pat. No. 3,674,736; 4,137,188 and 5,066,560.

Emulsion/aggregation processes for the preparation of toners with optional charge control additives are illustrated in a number of Xerox patents, the disclosures of each of which are totally incorporated herein by reference, such as U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797; and also of interest may be U.S. Pat. Nos. 5,348,832; 5,405,728; 5,366,841; 5,496,676; 5,527,658; 5,585,215; 5,650,255; 5,650,256 and 5,501,935 (spherical toners).

The appropriate processes and components of these patents may be selected for the formation of toner utilizing the latexes generated in accordance with the present invention.

SUMMARY OF THE INVENTION

It is a feature of the present invention to provide toner processes with many of the advantages illustrated herein.

In another feature of the present invention there are provided simple and economical processes for the preparation of latexes, and black and colored toner compositions with excellent colorant, especially pigment dispersions, thus enabling the achievement of excellent color print quality, and wherein the toners possess excellent fusing characteristics.

In a further feature of the present invention there is provided a process for the preparation of sediment free emulsions and toner compositions thereof with a volume average diameter of from between about 1 to about 20 microns, and preferably from about 2 to about 12 microns, and a particle size distribution of about 1.10 to about 1.35, and preferably from about 1.15 to about 1.25 as measured by a Coulter Counter without the need to resort to conventional classifications to narrow the toner particle size distribution.

In a further feature of the present invention there is provided a process for the preparation of toner by aggregation and coalescence, or fusion (aggregation/coalescence) of latex, pigment, and additive particles, and wherein the latex is substantially sediment free and is prepared as illustrated herein.

In yet another feature of the present invention there are provided toner compositions with low fusing temperatures of from about 120° C. to about 180° C., and which toner compositions exhibit excellent blocking characteristics at and above about 45° C.

These and other features of the present invention are accomplished in embodiments by the provision of toners and processes thereof. In embodiments of the present invention, there are provided sediment free, or substantially sediment free processes for the preparation of latexes, and toner compositions thereof by the aggregation/coalescence of latex and colorant, especially pigment particles, and wherein the temperature of the aggregation may be selected to control the aggregate size, and thus the final toner particle size, and the coalescence temperature and time may be utilized to control the toner shape and surface properties.

In embodiments, the present invention is directed to latex emulsion processes and aggregation and coalescence thereof with colorant particles, and wherein there is provided substantially sediment free toner compositions with a volume average diameter of from about 1 micron to about 20 microns, and preferably from about 2 microns to about 12 microns and a narrow particle size distribution of, for example, about 1.10 to about 1.45 as measured by the Coulter Counter method, without the need to resort to conventional toner pulverization and classification methods.

The resulting toners can be selected for known electrophotographic imaging and printing processes, including digital color processes. In embodiments, the present invention is directed to substantially sediment free processes comprised of blending an aqueous colorant, especially pigment dispersion containing a surfactant with a latex emulsion comprised of polymer particles, and an ionic surfactant of, for example, a diphenyloxide disulfonate, thereafter heating the resulting flocculent mixture at, for example, below about the resin glass transition temperature, and more specifically, from about 35° C. to about 60° C. (Centigrade) to form toner sized aggregates of from about 2 microns to about 20 microns in volume average diameter, and which toner is comprised of polymer, colorant, especially pigment and optionally additive particles, followed by heating the aggregate suspension above about the resin, or polymer glass transition temperature, and more specifically at, for example, from about 70° C. to about 100° C. to effect coalescence or fusion of the components of the aggregates and to form mechanically stable integral toner particles.

The present invention in embodiments is directed to processes for the preparation of polymer containing latexes and which latexes can be selected for emulsion/aggregation/coalescence processes illustrated in the patents mentioned hereinafter, and wherein the emulsion process comprises an in situ seeded, monomer emulsion fed semicontinuous polymerization wherein there is selected a diphenyloxide disulfonate surfactant, and there is enabled sediment, or substantially sediment free latexes.

In embodiments thereof, the present invention relates to a direct toner preparative process comprised of blending an aqueous colorant dispersion containing, for example, a colorant, such as red, green, blue, brown, orange, HELIOGEN BLUE™ or HOSTAPERM PINK™, and a cationic surfactant such as benzalkonium chloride (SANIZOL B-50™), and a latex emulsion containing an anionic surfactant of a diphenyloxide disulfonate, and an optional cosurfactant, and wherein the latex polymer is derived from emulsion polymerization of the monomers selected, for example, from the group consisting of styrene, acrylates, methacrylates, acrylonitrile, butadiene, acrylic acid, methacrylic acid, and the like, thereby resulting in the flocculation of the polymer particles with the colorant particles and optional additives; and which flocculent mixture, on further stirring at a temperature of from about 35° C. to about 60° C., results in the formation of toner sized aggregates having an aggregate size of from about 2 microns to about 20 microns in volume average diameter as measured by the Coulter Counter (Microsizer II) and a particle size distribution of about 1.15 to about 1.35; thereafter, heating the aggregate suspension at from about 70° C. to about 95° C. to form toner particles; followed by isolation by filtration, washing, and drying in an oven, or the like. The aforementioned toners are especially useful for imaging processes, especially xerographic processes, which usually require high toner transfer efficiency, such as those having a compact machine design without a cleaner or those that are designed to provide high quality colored images with excellent image resolution and signal-to-noise ratio, and image uniformity.

More specifically, the present invention relates to oxygen free, and sediment free emulsion processes, and wherein there is selected in situ seed, low agitation and monomer addition, and wherein there is selected for the emulsion polymerization a diphenyloxide disulfonate, such as DOWFAX 2A1™, sodium tetrapropyl diphenyloxide disulfonate, available from Dow Chemical. The in situ seed can be formed by adding a major suitable amount of the disulfonate to reacting components, forming the seed latex, then adding the remainder of the components. In the monomer emulsion, delayed addition water, sulfonate, monomers, chain transfer agent, and initiator are emulsified, then added to a reactor containing a resin latex.

Semicontinuous emulsion polymerization processes may also be selected, and which includes the starve fed method, can offer a number of advantages over current batch emulsion polymerization process for the preparation of E/A (emulsion/aggregation/coalescense) toner resins, such as (1) better control of heat management during the exothermic polymerization process, especially in large-scale production; (2) more control opportunities for particle size, particle stability, molecular weight and surface properties; (3) preservation of a more homogeneous composition for the latexes; and (4) the opportunity to create core-shell particles by changing the final monomer composition or comonomer ratio.

In embodiments, the present invention relates to an oxygen-free emulsion process which utilizes in situ seed, stirring, or agitation, and monomer emulsion addition. The exclusion of oxygen in an emulsion reaction system, or process ensures latex reproducibility, especially in manufacturing scaleup, since oxygen can interact with the chain transfer agent and inhibit the polymerization. The use of seed latex also significantly reduces batch-to-batch variations in emulsion polymerization processes. Also, in situ seed formation at the beginning of a reaction is simplified since no additional reactor is needed to formulate the seed latexes. Rather, with the processes of the present invention in embodiments the in situ seed is formed by adding a major, for example about 50 percent or more, specifically from about 50 to about 95 percent part of the sulfonate emulsifier to a portion of the reacting ingredients of monomers, for example from about 0.5 to about 50 percent by weight, and preferably from about 3 to about 25 percent by weight of total monomers used to prepare the copolymer resin, chain transfer agent, from about 0.5 to about 50 percent by weight, and preferably from about 3 to about 25 percent by weight of total chain transfer agent used to prepare the copolymer resin, and initiator from about 0.5 to about 100 percent by weight, and preferably from about 3 to about 100 percent by weight of total initiator used to prepare the copolymer resin, forming the seed latex and then adding the remaining reagents of monomers, chain transfer agent, initiator, emulsifier, and water. In the monomer emulsion addition process, water, from about 5 to about 90 percent by weight, and preferably from about 10 to about 50 percent by weight of total water used to prepare the latex emulsion, emulsifier from about 5 to about 50 percent by weight, and preferably from about 5 to about 35 percent by weight of total monomers used to prepare the copolymer resin, monomers, from about 50 to about 99.5 percent by weight, and preferably from about 75 to about 97 percent by weight of total monomers used to prepare the copolymer resin, chain transfer agent, from about 50 to about 99.5 percent by weight, and preferably from about 75 to about 97 percent by weight of total chain transfer agent used to prepare the copolymer resin, and initiator, from about 0 to about 99.5 percent by weight, and preferably from about 0 to about 97 percent by weight of total initiator used to prepare the copolymer resin, are emulsified, then added to the reactor. An advantage of emulsion monomer feeding is improved control of reaction temperature. Also, there can be selected a lower quantity, for example from about less than 1 percent to about less than 10 percent based on the total latex emulsion, of the disperse phase, the fine particles, for example from about 0.05 micron to about 0.5 micron in diameter size of the polymer obtained, coagulation and microsuspension of monomer droplets possess less of a tendency to occur during the reaction.

In embodiments, the process of the present invention comprises an in situ seeded, monomer emulsion addition emulsion polymerization process for the preparation of latex particles comprising (i) providing the reactor with an initial liquid composition comprising water, from about 10 to about 95 percent by weight, and preferably from about 50 to about 90 percent by weight of total water, and disulfonate surfactant or surfactants, from about 50 to about 95 percent by weight, and preferably from about 65 to about 95 percent by weight of total monomers used to prepare the copolymer resin;

(ii) conducting a pre-reaction monomer emulsification which comprises emulsification of the polymerization reagents of monomers, chain transfer agent, water, surfactant, and optional, but preferably an initiator, and wherein said emulsification is accomplished at a low temperature of, for example, from about 5° C. to about 40° C.;

(iii) preparing a seed particle latex by aqueous emulsion polymerization of a mixture comprised of part of the monomer emulsion, from about 0.5 to about 50 percent by weight, and preferably from about 3 to about 25 percent by weight of monomer emulsion prepared in (ii);

(iv) and an optional free radical initiator, from about 0.5 to about 100 percent by weight, and preferably from about 3 to about 100 percent by weight of total initiator used to prepare the copolymer resin at a temperature of from about 35° C. to about 125° C., wherein the reaction of the free radical initiator and monomer produces the seed latex comprised of latex resin (the reaction products of monomers and initiator; and wherein the particles are stabilized by surfactants);

(v) heating and feed adding to the formed seed particles the remaining monomer emulsion, from about 50 to about 99.5 percent by weight, and preferably from about 75 to about 97 percent by weight of monomer emulsion prepared in (iii) used to prepare the copolymer, and an optional free radical initiator, from about 0 to about 99.5 percent by weight, and preferably from about 0 to about 97 percent by weight of total initiator used to prepare the copolymer resin at a temperature from about 35° C. to about 125° C., and (vi) retaining the above contents in the reactor at the temperature of from about 35° C. to about 125° C. for an effective time period, for example from about 0.5 to about 8 hours, and preferably from about 1.5 to about 6 hours, followed by cooling.

A portion of the monomers is used to form the seed particles, where the seed particle resin is from about 0.5 to about 50 percent by weight, and preferably from about 3 to about 25 percent by weight of monomers used to prepare the copolymer resin.

Embodiments of the present invention also include a process according to (v) above wherein the addition of the remaining monomer emulsion is fed to subsequent generated seed particles at an effective time period of about 0.5 to about 10 hours, and preferably about 2 to about 6 hours, or wherein the seed particles generated in (iv) can be of small average particle size, such as from about 0.005 to about 0.5 micron, and preferably from about 0.01 to about 0.3 micron in volume average diameter as measured by the light scattering technique on a Coulter N4 Plus Particle Sizer.

The emulsifier or surfactant selected for the preparation of the latexes can be of the formula

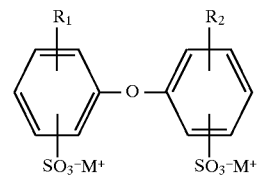

wherein $R_1$ or $R_2$ is hydrogen, or alkyl with, for example, from about 1 to about 25 carbons and preferably from about 6 to about 16 carbon atoms, and M is hydrogen, an alkali metal, such as sodium, or potassium, or ammonium ($NH_4$) with the preferred emulsifier being sodium tetrapropyl diphenyloxide disulfonate. For sodium n-decyl diphenyloxide disulfonate, $R_1$ is hydrogen, $R_2$ is a n-decyl group, and M is sodium. Examples of specific emulsifiers include sodium hexyl diphenyloxide disulfonate, sodium n-decyl diphenyloxide disulfonate, sodium n-dodecyl diphenyloxide disulfonate, sodium n-hexadecyl diphenyloxide disulfonate, sodium palmityl diphenyloxide disulfonate, n-decyl diphenyloxide disulfonic acid, n-dodecyl diphenyloxide disulfonic acid, and tetrapropyl diphenyloxide disulfonic acid.

The emulsifiers or surfactants include diphenyloxide disulfonates, such as DOWFAX 2A1™, DOWFAX 3A2™, DOWFAX 8390™ available Dow Chemical, RHODACAL DSB™ available from Rhone-Poulenc, POLY-TERGENT 2A1™, POLY-TERGENT 2EP™ available from Olin, AEROSOL DPOS-45™ available from Cytec, CALFAX DBA-40™, CALFAX 16L-35™ available from Pilot Chemicals, and the like. Diphenyloxide disulfonates can be prepared by a Friedl-Kraft alkylation reaction of diphenyloxide using defined alkane fractions, followed by sulfonation. Diphenyloxide disulfonate emulsifiers represents a class of highly anionic surface active agents consisting of disulfonated alkyl diphenyl oxide molecules in which the charge arises from two sulfonate groups rather than one as in the majority of surfactants (such as dodecylbenzene sulfonate), provides excellent emulsion stability. The Dow Chemical available components, reference, for example, Dow bulletins entitled DOWFAX Anionic Surfactants For High Performance Products should have a high electrolyte tolerance, high mechanical stability, and excellent stability in concentrated acids and alkalis. Diphenyloxide disulfonates also possess high oxidation resistance and high temperature stability up to, for example, 95° C. rendering them suitable for use in emulsion polymerization wherein sediment free latexes are generated.

In embodiments, the present invention is directed to processes for the preparation of toner compositions which comprises blending an aqueous colorant dispersion preferably containing a pigment, such as carbon black, phthalocyanine, quinacridone or RHODAMINE B™ type, with a cationic surfactant, such as benzalkonium chloride, with a latex emulsion prepared as illustrated herein and which latex is sediment free, and wherein the latex monomers are selected from the group consisting of styrene, butadiene, acrylates, methacrylates, acrylonitrile, acrylic acid, methacrylic acid, and the like, and which latex contains the disulfonate emulsifier, or nonionic surfactant; heating the resulting flocculent mixture at a temperature below or about equal to the Tg of the polymer or resin formed in the latex, ranging, for example, from about 30° C. to about 55° C. for an effective length of time of, for example, 0.5 hour to about 2 hours to form toner sized aggregates; and subsequently heating the aggregate suspension at a temperature at or above the Tg of the latex polymer, for example from about 60° C. to about 100° C. to provide toner particles; and isolating the toner product by filtration, thereafter washing and drying in an oven, fluid bed dryer, freeze dryer, or spray dryer; whereby toner particles comprised of polymer, or resin, colorant, and optional additives are obtained.

Optional cosurfactants are selected from the group consisting of those alkanes, and hydrocarbyl alcohols, ethers, amines, halides and esters, which are inert, nonvolatile, water-insoluble liquid at a temperature of about 40° C. to about 90° C., and contain a terminal aliphatic hydrocarbyl group, and mixtures thereof. The terminal aliphatic hydrocarbyl group of at least about 10, and from about 10 to about 20 carbon atoms contained therein may be unsaturated but is preferably saturated, and branched and is preferably straight chain. These cosurfactants should be relatively highly water insoluble, to the extent of less than about $10^{-3}$ grams, preferably less than about $10^{-4}$ grams, per liter of water in the aqueous phase, and they should not have too high a molecular weight, for example not more than about 5,000, preferably not more than about 2,000, and still more preferably from about 100 to 500. Examples of cosurfactants include alkanes, such as n-decane, n-tetradecane, n-hexadecane, n-octadecane, eicosane, tetracosane, 1-decene, 1-dodecene, 2-hexadecyne, 2-tetradecyne, 3-octyne, 4-octyne, and 1-tetradecene; alicyclic hydrocarbons, such as dodecyl cyclohexane; aromatic hydrocarbons such as hexadecyl benzene; alcohols such as decanol, lauryl alcohol, tetradecanol, cetyl alcohol, octadecanol, eicosanol, 1-heptadecanol and ceryl alcohol; hydrocarbyl alcohol esters of lower molecular weight carboxylic acids, such as cetyl acetate; ethers, such as octyl ether and cetyl ether; amines, such as tetradecyl amine, hexadecyl amine, and octadecyl amine; halides, such as hexadecyl chloride and other chlorinated paraffins; hydrocarbyl carboxylic acid esters of lower molecular weight alcohols, such as methyl, ethyl and isoamyl octanoate, methyl and octyl caprate, ethyl stearate, isopropyl myristate, methyl, isoamyl and butyl oleate, glyceryl tristearate, soybean oil, coconut oil, tallow, laurin, myristin, olein and the like. With the processes of the present invention, cosurfactants as illustrated herein are selected and preferably cosurfactants of dodecane, hexadecane, lauryl alcohol, or cetyl alcohol, and which cosurfactants can be selected in various suitable amounts, such as from about 0.005 to about 5, and preferably from about 0.5 to about 3 weight percent, or parts based on the monomer, or monomers used to prepare the polymer resin. These cosurfactants can increase the stability of the fine size particle emulsions by inhibiting sedimentation or degradation caused by the tendency of the small particles or droplets to coalescence or diffuse molecularly. The cosurfactants should preferably be inert, and resistant to diffusion into an aqueous medium.

Embodiments of the present invention include a process for the preparation of toner comprised of polymer and colorant, especially pigment, comprising
  (i) blending an aqueous pigment dispersion containing an ionic surfactant with an emulsion latex containing resin, or polymer, and an emulsifier with a charge polarity opposite to that of the ionic surfactant in the pigment dispersion;
  (ii) heating the resulting mixture at a temperature of about 25° C. to about 1° C. below the Tg (glass transition temperature) of the latex resin, or polymer to form toner sized aggregates;
  (iii) subsequently heating the aggregate suspension to a temperature of about 75° C. to about 120° C. to effect coalescence or fusion of the components of aggregates to enable formation of integral toner particles comprised of polymer, and colorant; and
  (iv) isolating the toner product by, for example, filtration, followed by washing and drying.

In embodiments the present invention is directed to processes for the preparation of toner compositions which comprise (i) preparing an ionic colorant mixture by dispersing a colorant, especially pigment, such as carbon black, red, blue, HOSTAPERM PINK™, or PV FAST BLUE™ in an aqueous surfactant solution containing a cationic surfactant, such as dialkylbenzene dialkylammonium chloride like SANIZOL B-50™ available from Kao, or MIRAPOL™ available from Alkaril Chemicals, by means of a high shearing device such as a Brinkmann Polytron or IKA homogenizer; (ii) adding the aforementioned colorant, especially pigment mixture, to a mixture of a water optional known toner additive, and a latex emulsion prepared as illustrated herein and comprised of polymer particles of, for example, poly(styrene-butyl acrylate-acrylic acid), poly (styrene-butadiene-acrylic acid), and the like, and the sulfonate emulsifier, a nonionic surfactant such as polyethylene glycol or polyoxyethylene glycol nonyl phenyl ether or IGEPAL 897™ obtained from GAF Chemical Company, and an optional cosurfactant, thereby causing a flocculation of pigment, polymer particles and optional additives; (iii) homogenizing the resulting flocculent mixture with a high shearing device, such as a Brinkmann Polytron or IKA homogenizer, and further stirring with a mechanical stirrer at a temperature of about 1° C. to about 25° C. below the Tg of the latex polymer to form toner sized aggregates of from about 2 microns to about 20 microns in volume average diameter; (iv) heating the mixture in the presence of additional anionic surfactant or nonionic surfactant at a temperature of 120° C. or below for a duration of, for example, from about 1 to about 5 hours to form 2 to about 12 micron toner preferably with a particle size distribution of from about 1.15 to about 1.35 as measured by the Coulter Counter; and (v) isolating the toner particles by filtration, washing, and drying. Additives to improve flow characteristics and charge additives, if not initially present, to improve charging characteristics may then be added by blending with the formed toner, such additives including AEROSILS® or silicas, metal oxides like tin, titanium and the like, metal salts of fatty acids like zinc stearate, and which additives are present in various effective amounts, such as from about 0.1 to about 10 percent by weight of the toner.

The present invention relates to a process for the preparation of a latex comprising the polymerization of monomer in the presence of a chain transfer component, an initiator, a diphenyloxide disulfonate, and an optional nonionic surfactant; a process wherein the sulfonate is of the formula

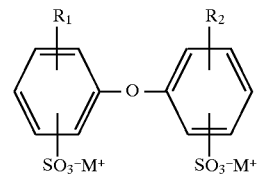

wherein $R_1$ or $R_2$ is hydrogen, or alkyl, and M is hydrogen, an alkali metal, or ammonium; a process wherein the sulfonate is sodium tetrapropyl diphenyloxide disulfonate; a process comprising
  (i) providing the reactor with an initial liquid composition comprising of water, from about 10 to about 95 percent by weight, and preferably from about 50 to about 90 percent by weight of total water used to prepare the latex emulsion, and surfactant and disulfonate, from about 50 to about 95 percent by weight, and preferably from about 65 to about 95 percent by weight of total monomers used to prepare the copolymer resin;

(ii) accomplishing a pre-reaction monomer emulsification which comprises emulsification of the polymerization reagents of monomers, chain transfer agent, water, disulfonate, surfactant, and initiator, and wherein said emulsification is accomplished at a low temperature of from about 5° C. to about 40° C.; and preparing a seed particle latex by aqueous emulsion polymerization of a mixture comprised of from about 25 to about 75 percent of the monomer emulsion and an optional free radical initiator at a temperature of from about 35° C. to about 125° C., wherein the reaction of the free radical initiator and monomer generates the seed latex;

(iii) heating and adding to the seed particles the remaining monomer emulsion and an optional free radical initiator at a temperature from about 35° C. to about 125° C.; and (iv) retaining the above contents in the reactor at said temperature of from about 35° C. to about 125° C. for an effective time period of from about 0.5 to about 8 hours, and preferably from about 2 to about 6 hours, following by cooling; a process comprising (i) providing an initial liquid composition comprising water, from about 10 to about 95 percent by weight, and disulfonate surfactant, from about 50 to about 95 percent by weight;

(ii) conducting a pre-reaction monomer emulsification which comprises emulsification of the polymerization reagents of monomers, chain transfer agent, water, disulfonate, surfactant, and an optional initiator, and wherein said emulsification is accomplished at a low temperature, from about 5° C. to about 40° C.;

(iii) preparing a seed particle latex by aqueous emulsion polymerization of a mixture comprised of part of said monomer emulsion of (ii), from about 0.5 to about 50 percent by weight, and an optional free radical initiator, from about 0.5 to about 100 percent by weight, at a temperature of from about 35° C. to about 125° C., wherein the reaction of the free radical initiator and monomer produces a seed resin latex;

(iv) heating and feed adding to the seed particles the remaining monomer emulsion of (ii), from about 50 to about 99.5 percent by weight, and optional free radical initiator, from about 0 to about 99.5 percent by weight, at a temperature of from about 35° C. to about 125° C.; and (v) retaining the above contents in the reactor at the temperature of from about 35° C. to about 125° C. for a suitable time period, followed by cooling; a process wherein the latex contains substantially no sediment; a process for the preparation of toner (i) aggregating a colorant dispersion with the latex emulsion;

(ii) coalescing or fusing the aggregates generated; and optionally, but preferably (iii) isolating, washing, and drying the toner; a process wherein said aggregating is below about the latex polymer glass transition temperature present in the latex emulsion, the coalescing or fusing of said aggregates is above about the polymer glass transition temperature, and there results toner with a size of from about 2 to about 20 microns in volume average diameter; a process wherein said temperature below the glass transition temperature is from about 25° C. to about 60° C., and the heating above the glass transition temperature is from about 60° C. to about 100° C.; a process wherein said temperature below the glass transition temperature is from about 35° C. to about 55° C., and the heating above the glass transition temperature is from about 70° C. to about 95° C.; a process wherein the temperature at which said aggregation is accomplished controls the size of the aggregates, and wherein the final toner size is from about 2 to about 10 microns in volume average diameter, and wherein the temperature and time of said coalescence or fusion of the components of aggregates control the shape of the resultant toner; a process wherein the aggregation temperature is from about 45° C. to about 55° C., and wherein the coalescence or fusion temperature is from about 80° C. to about 95° C.; a process wherein there is further selected for the latex preparation a cosurfactant selected from the group consisting of alkanes, hydrocarbyl alcohols, ethers, amines, halides, and esters; a process wherein the colorant is a pigment, and wherein said pigment dispersion contains an ionic surfactant; a process wherein the surfactant utilized in the colorant dispersion is a cationic surfactant; a process wherein the aggregation is conducted at a temperature of about 15° C. to about 1° C. below the Tg of the latex polymer, or latex resin for a duration of from about 0.5 hour to about 3 hours; and wherein the coalescence or fusion of the components of aggregates for the formation of integral toner particles comprised of colorant, resin and additives is accomplished at a temperature of about 85° C. to about 105° C. for a duration of from about 1 hour to about 5 hours; a process wherein the latex polymer contains a polymer selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly (styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), and poly(alkyl acrylate-acrylonitrile-acrylic acid; a process wherein the latex contains a polymer selected from the group consisting of poly(styrenebutadiene), poly (methylstyrene-butadiene), poly(methyl methacrylate-butadiene), poly(ethyl methacrylate-butadiene), poly (propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly (methyl acrylate-isoprene), poly(ethyl acrylate-isoprene), poly(propyl acrylate-isoprene), and poly (butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly(styrene-butyl acrylate-acrylononitrile-acrylic acid; a process wherein the colorant is carbon black, cyan, yellow, magenta, and mixtures thereof; a process wherein the toner particles isolated are from about 2 to about 10 microns in volume average diameter, and the particle size distribution thereof is from about 1.15 to about 1.30, and wherein there is added to the surface of the formed toner metal salts, metal salts of fatty acids, silicas, metal oxides, or mixtures thereof, each in an amount of from about 0.1 to about 10 weight percent of the obtained toner particles; a process wherein said disulfonate is sodium n-decyl diphenyloxide disulfonate, or sodium n-hexyl diphenyloxide disulfonate; a process wherein alkyl contains from 1 to about 25 carbon atoms; a process wherein said alkali metal is sodium or potassium; and a process for the preparation of a latex containing a polymer which comprises polymerizing a monomer, or monomers in the presence of a chain transfer compound, an initiator compound, and a diphenyloxide disulfonate of the formula

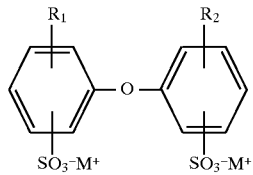

wherein $R_1$ or $R_2$ is hydrogen, or alkyl, and M is hydrogen, an alkali metal, or ammonium.

Illustrative examples of specific latex resin, polymer or polymers selected for the process of the present invention include known polymers such as poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-butylacrylate), poly(styrene-butadiene), poly(styrene-isoprene), poly(styrene-butyl methacrylate), poly(styrene-butyl acrylate-acrylic acid), poly(styrene-butadiene-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), poly(acrylonitrile-butyl acrylate-acrylic acid), and the like. The latex polymer is generally present in the toner compositions in various effective amounts, such as from about 75 weight percent to about 98 weight percent of the toner, and the latex resin size suitable for the processes of the present invention can be, for example, of from about 0.05 micron to about 1 micron in volume average diameter as measured by the Brookhaven nanosize particle analyzer. Other sizes and effective amounts of latex polymer may be selected in embodiments.

The polymer selected for the process of the present invention is preferably prepared by emulsion polymerization methods, and the monomers utilized in such processes include styrene, acrylates, methacrylates, butadiene, isoprene, acrylic acid, methacrylic acid, acrylonitrile, and the like. Known chain transfer agents, for example dodecanethiol, about 0.1 to about 10 percent, or carbon tetrabromide in effective amounts, such as from about 0.1 to about 10 percent, can also be utilized to control the molecular weight properties of the polymer when emulsion polymerization is selected. Other processes of obtaining polymer particles of from, for example, about 0.01 micron to about 2 microns can be selected from polymer microsuspension process, such as disclosed in U.S. Pat. No. 3,674,736, the disclosure of which is totally incorporated herein by reference, polymer solution microsuspension process, such as disclosed in copending application U.S. Pat. No. 5,290,654, the disclosure of which is totally incorporated herein by reference, mechanical grinding processes, or other known processes.

Various known colorants, such as pigments, present in the toner in an effective amount of, for example, from about 1 to about 15 percent by weight of toner, and preferably in an amount of from about 3 to about 10 percent by weight, that can be selected include carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colored pigments and dyes that can be selected are cyan, magenta, or yellow pigments, and mixtures thereof. Examples of magentas include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra (octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as pigments with the process of the present invention. Colorants include pigment, dye, mixtures of pigment and dye, mixtures of pigments, mixtures of dyes, and the like.

The toner may also include known charge additives in effective suitable amounts of, for example, from 0.1 to 5 weight percent such as alkyl pyridinium halides, bisulfates, the charge control additives of U.S. Pat. Nos. 3,944,493; 4,007,293; 4,079,014; 4,394,430 and 4,560,635, which illustrates a toner with a distearyl dimethyl ammonium methyl sulfate charge additive, the disclosures of which are totally incorporated herein by reference, negative charge enhancing additives like aluminum complexes, and the like.

Surfactants in effective amounts of, for example, 0.01 to about 15 weight percent of the reaction mixture in embodiments include, for example, nonionic surfactants, such as dialkylphenoxypoly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™, in effective amounts of, for example, from about 0.1 to about 10 percent by weight of the reaction mixture; anionic surfactants, such as for example sodium dodecylsulfate (SDS), sodium dodecylbenzene sulfonate, sodium dodecyinaphthalene sulfate, dialkyl benzenealkyl, sulfates and sulfonates, abitic acid, available from Aldrich, NEOGEN R™, NEOGEN SC™ obtained from Kao, BIOSOFT D-40™ obtained from Stepan, and the like, in effective amounts of, for example, from about 0.01 to about 10 percent by weight; cationic surfactants such as for example dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™ available from Alkaril Chemical Company, SANIZOL™ (benzalkonium chloride), available from Kao Chemicals, and the like, in effective amounts of, for example, from about 0.01 percent to about 10 percent by weight. Preferably, the molar ratio of the cationic surfactant used for flocculation to the anionic surfactant used in the latex preparation is in the range of from about 0.5 to 4.

Examples of the surfactant, which can be added to the aggregates before coalescence is initiated, can be anionic surfactants, such as sodium dodecylbenzene sulfonate, sodium dodecylnaphthalene sulfate, dialkyl benzenealkyl, sulfates and sulfonates, abitic acid, available from Aldrich, NEOGEN R™, NEOGEN SC™ obtained from Kao, BIOSOFT D-40™ obtained from Stepan, and the like. They can also be selected from nonionic surfactants such as polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. An effective amount of the anionic or nonionic surfactant utilized in the coalescence to primarily stabilize the aggregate size against further growth with temperature is, for example, from about 0.01 to about 10 percent by weight, and preferably from about 0.5 to about 5 percent by weight of the reaction.

Surface additives that can be added to the toner compositions after washing or drying include, for example, metal salts, metal salts of fatty acids, colloidal silicas, metal oxides like titanium oxides, mixtures thereof and the like, which additives are usually present in an amount of from about 0.1 to about 2 weight percent, reference U.S. Pat. No. 3,590,000; 3,720,617; 3,655,374 and 3,983,045, the disclosures of which are totally incorporated herein by reference. Preferred additives include zinc stearate and AEROSIL R972® available from Degussa in amounts of from about 0.1 to about 2 percent which can be added during the aggregation process or blended into the formed toner product.

Developer compositions can be prepared by mixing the toners obtained with the processes of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration.

Imaging methods are also envisioned with the toners of the present invention, reference for example a number of the patents mentioned herein, and U.S. Pat. Nos. 4,265,990; 4,585,884 and 4,563,408, the disclosures of which are totally incorporated herein by reference.

The following Examples are being submitted to further illustrate various pieces of the present invention. These Examples are intended to be illustrative only and are not intended to limit the scope of the present invention.

EXAMPLE I

A latex was prepared by the semicontinuous emulsion polymerization of styrene/butyl acrylate/acrylic acid, 75/25/3 parts (by weight), using a diphenyloxide disulfonate surfactant as follows. A 2 liter jacketed glass flask with a stirrer set at 200 rpm, and containing 8.8 grams of DOWFAX 2A1™ (sodium tetrapropyl diphenyloxide disulfonate, 47 percent active, available from Dow Chemical), 6.0 grams of polyoxyethylene nonyl phenyl ether nonionic surfactant, ANTAROX CA 897™ (70 percent active), and 519 grams of deionized water was purged with nitrogen for 30 minutes while the temperature was from about 25° C. to 80° C. A monomer emulsion was prepared by homogenizing a monomer mixture (405 grams of styrene, 135 grams of n-butyl acrylate, 16.2 grams of acrylic acid, and 8.1 grams of 1-dodecanethiol) with an aqueous solution (4.4 grams of DOWFAX 2A1™, 3.0 grams of ANTAROX CA-897™, and 251 grams of deionized water) at 10,000 rpm for 5 minutes at room temperature of about 25° C. via VirTishear Cyclone Homogenizer. Forty one (41) grams of seed was removed from the monomer emulsion and added into the flask, and the flask contents were stirred for 5 minutes at 80° C. An initiator solution prepared from 8.1 grams of ammonium persulfate in 40 grams of deionized water was added to the flask mixture over 20 minutes. Stirring continued for an additional 20 minutes to allow a seed particle formation. The remaining 782 grams of monomer emulsion were fed continuously into the reactor over 4 hours and 40 minutes. The nitrogen purge was reduced to a slow trickle to maintain a small positive pressure. After the above monomer emulsion addition was completed, the reaction was allowed to post react for 120 minutes at 80° C. No strong exotherm was observed throughout the reaction when the above in situ seeded, monomer emulsion fed process was implemented. Only a very mild exotherm of about 0.3° C. was observed during the initial seed formation stage. The resulting latex polymer possessed an $M_w$ of 28,000, an $M_n$ of 9,100, as determined on a Waters GPC, and a mid-point Tg of 53.5° C., as measured on a Seiko DSC. The latex resin possessed an volume average diameter of 175 nanometers as measured by light scattering technique on a Coulter N4 Plus Particle Sizer.

No sediment was observed after the latex was allowed to stand for two full weeks. The amount of sediment determined via an IEC Centrifuge at 3,120 G-force for 50 seconds was less than 0.1 weight percent of the latex after two weeks.

260.0 Grams of the above prepared latex emulsion and 220.0 grams of an aqueous cyan pigment dispersion containing 7.6 grams of Cyan Pigment 15:3, and 2.3 grams of cationic surfactant SANIZOL B-50™ were simultaneously added to 400 milliliters of water with high shear stirring at 7,000 rpm for 3 minutes by means of a polytron. The resulting mixture was then transferred to a 2 liter reaction vessel and heated at a temperature of 48° C. for 1.5 hours before 30 milliliters of 20 percent aqueous BIOSOFT D-40™ solution were added. Aggregates with a particle size (volume average diameter) of 6.8 microns with a GSD=1.17, as measured on the Coulter Counter, were obtained. Subsequently, the mixture was heated to 93° C. and held there for a period of 2.5 hours before cooling down to room temperature, about 25° C. throughout, filtered, washed with water, and dried in a freeze dryer. The final toner product evidenced a particle size of 7.4 microns in volume average diameter with a particle size distribution of 1.19 as measured on a Coulter Counter.

The resulting toner, that is the above final toner product, was comprised of about 93 percent of polymer, poly (styrene-butyl acrylate-acrylic acid), and Cyan Pigment 15:3, about 7 percent by weight of toner, with an volume average diameter of 7.4 microns and a GSD of 1.19, indicating that one can retain toner particle size and GSD achieved in the aggregation step during coalescence without the aggregates falling apart, or separating and without an excessive increase in particle size, when a sediment free emulsion polymer was prepared via the above semicontinuous emulsion polymerization process by adding a surfactant of sodium tetrapropyl diphenyloxide disulfonate to, for example, enhance the latex stability.

The major advantage of using the above semicontinuous emulsion latex is the absence, or substantial absence of sediments; reduced batch-to-batch variation, for example better reproducibility; and reduced exotherm of the emulsion polymerization.

EXAMPLE II

A latex was prepared by semicontinuous emulsion polymerization of styrene/butyl acrylate/acrylic acid, 80/20/3 parts (by weight), using a diphenyloxide disulfonate surfactant as follows. A 2 liter jacketed glass flask with a stirrer set at 200 rpm, and containing 12.6 grams of DOWFAX 2A1™ (47 percent active), 6.0 grams of ANTAROX CA 897™ (70 percent active), and 559 grams of deionized water was purged with nitrogen for 30 minutes while the temperature was from about 25° C. to about 80° C. A monomer emulsion was prepared by homogenizing a monomer mixture (432 grams of styrene, 108 grams of n-butyl acrylate, 16.2 grams of acrylic acid, and 10.8 grams of 1-dodecanethiol) with an aqueous solution (6.3 grams of DOWFAX 2A1™, 3.0 grams of ANTAROX CA-897™, 8.1 grams of ammonium persulfate, and 251 grams of deionized water) at 10,000 rpm for 5 minutes at room temperature of about 25° C. via VirTishear Cyclone Homogenizer. Forty-two (42) grams of seed were removed from the monomer emulsion and added into the flask, and the flask contents were stirred for 40 minutes at 80° C. to allow seed particle formation. The remaining 793 grams of monomer emulsion were fed continuously into the reactor over 4 hours and 32 minutes. The nitrogen purge was reduced to a slow trickle to maintain a small positive pressure. After monomer emulsion addition was completed, the reaction was allowed to post react for 90 minutes at 80° C. No strong exotherm was observed throughout the reaction when this in situ seeded, monomer emulsion fed process was implemented. Only a very mild exotherm of about 0.3° C. was observed during the initial seed formation stage. The resulting latex polymer possessed an $M_w$ of 22,300, an $M_n$ of 7,000, as determined on a Waters GPC, and a mid-point Tg of 61.4° C., as measured on a Seiko DSC. The latex resin possessed an volume average diameter of 162 nanometers as measured by light scattering technique on a Coulter N4 Plus Particle Sizer.

No sediment was observed after the latex was allowed to stand for two full weeks. The amount of sediment determined via an IEC Centrifuge at 3,120 G-force for 50 seconds was less than 0.05 weight percent of the latex after two weeks.

260.0 Grams of the above prepared latex emulsion and 220.0 grams of an aqueous cyan pigment dispersion containing 7.6 grams of Cyan Pigment 15:3, and 2.3 grams of cationic surfactant SANIZOL B-50™ were simultaneously added to 400 milliliters of water with high shear stirring at 7,000 rpm for 3 minutes by means of a polytron. The resulting mixture was then transferred to a 2 liter reaction vessel and heated at a temperature of 53° C. for 1.5 hours before 30 milliliters of 20 percent aqueous BIOSOFT D-40™ solution were added. Aggregates with a particle size (volume average diameter) of 7.9 microns with a GSD=1.17, as measured on the Coulter Counter, were obtained. Subsequently, the mixture was heated to 93° C. and held there for a period of 2 hours before cooling down to room temperature, about 25° C. throughout, filtered, washed with water, and dried in a freeze dryer. The final toner product evidenced a particle size of 8.0 microns in volume average diameter with a particle size distribution of 1.18 as measured on a Coulter Counter.

The resulting toner, that is the above final toner product, was comprised of about 93 percent of polymer, poly (styrene-butyl acrylate-acrylic acid), and Cyan Pigment 15:3, about 7 percent by weight of toner, with an volume average diameter of 8.0 microns and a GSD of 1.18, indicating that one can retain toner particle size and GSD achieved in the aggregation step during coalescence without the aggregates falling apart, or separating and without an excessive increase in particle size, when a sediment free emulsion polymer was prepared via the above semicontinuous emulsion polymerization process by adding a surfactant of sodium tetrapropyl diphenyloxide disulfonate to, for example, enhance the latex stability.

EXAMPLE III

A latex was prepared by semicontinuous emulsion polymerization of styrene/butyl acrylate/acrylic acid, 75/25/3 parts (by weight), using a diphenyloxide disulfonate surfactant as follows. A 2 liter jacketed glass flask with a stirrer set at 200 rpm, and containing 8.8 grams of DOWFAX 2A1™ (47 percent active), and 519 grams of deionized water was purged with nitrogen for 30 minutes while the temperature was from about 25° C. to about 80° C. A monomer emulsion was prepared by homogenizing a monomer mixture (405 grams of styrene, 135 grams of n-butyl acrylate, 16.2 grams of acrylic acid, and 8.1 grams of 1-dodecanethiol) with an aqueous solution (4.4 grams of DOWFAX 2A1™ and 251 grams of deionized water) at 10,000 rpm for 5 minutes at room temperature of about 25° C. via VirTishear Cyclone Homogenizer. Forty-two (42) grams of seed were taken from the monomer emulsion and added into the flask, and were stirred for 5 minutes at 80° C. An initiator solution prepared from 8.1 grams of ammonium persulfate in 40 grams of deionized water was added over 18 minutes. Stirring continued for an additional 20 minutes to allow seed particle formation. The remaining 778 grams of monomer emulsion were fed continuously into the reactor over 4 hours and 40 minutes. The nitrogen purge was reduced to a slow trickle to maintain a small positive pressure. After monomer emulsion addition was completed, the reaction was allowed to post react for 120 minutes at 80° C. No strong exotherm was observed throughout the reaction when this in situ seeded, monomer emulsion fed process was implemented. Only a very mild exotherm of about 0.3° C. was observed during the initial seed formation stage. The resulting latex polymer possessed an $M_w$ of 30,000, an $M_n$ of 8,800, as determined on a Waters GPC, and a mid-point Tg of 51.3° C., as measured on a Seiko DSC. The latex resin possessed a volume average diameter of 163 nanometers as measured by light scattering technique on a Coulter N4 Plus Particle Sizer.

No sediment was observed after the latex was allowed to stand for two full weeks. The amount of sediment determined via an IEC Centrifuge at 3,120 G-force for 50 seconds was less than 0.1 weight percent of the latex after two weeks.

260.0 Grams of the above prepared latex emulsion and 220.0 grams of an aqueous cyan pigment dispersion containing 7.6 grams of Cyan Pigment 15:3, and 2.3 grams of cationic surfactant SANIZOL B-50™ were simultaneously added to 400 milliliters of water with high shear stirring at 7,000 rpm for 3 minutes by means of a polytron. The resulting mixture was then transferred to a 2 liter reaction vessel and heated at a temperature of 47° C. for 1.5 hours before 26 milliliters of 20 percent aqueous BIOSOFT D-40™ solution were added. Aggregates with a particle size (volume average diameter) of 8.5 microns with a GSD=1.17, as measured on the Coulter Counter, were obtained. Subsequently, the mixture was heated to 93° C. and held there for a period of 2.5 hours before cooling down to room temperature, about 25° C. throughout, filtered, washed with water, and dried in a freeze dryer. The final toner product evidenced a particle size of 8.6 microns in volume average diameter with a particle size distribution of 1.21 as measured on a Coulter Counter.

The resulting toner, that is the above final toner product, was comprised of about 93 percent of polymer, poly (styrene-butyl acrylate-acrylic acid), and Cyan Pigment 15:3, about 7 percent by weight of toner, with a volume average diameter of 8.6 microns and a GSD of 1.21, indicating that one can retain toner particle size and GSD achieved in the aggregation step during coalescence without the aggregates falling apart, or separating and without an excessive increase in particle size.

EXAMPLE IV

A latex was prepared by semicontinuous emulsion polymerization of styrene/butyl acrylate/acrylic acid, 80/20/3 parts (by weight), using a diphenyloxide disulfonate surfactant as follows. A 2 liter jacketed glass flask with a stirrer set at 200 rpm, and containing 13.2 grams of DOWFAX 3B2™ (sodium n-decyl diphenyloxide disulfonate, 45 percent active, available from Dow Chemical), 6.0 grams of ANTAROX CA 897™ (70 percent active), and 519 grams of deionized water was purged with nitrogen for 30 minutes while the temperature was from about 25° C. to about 80° C. A monomer emulsion was prepared by homogenizing a monomer mixture (432 grams of styrene, 108 grams of n-butyl acrylate, 16.2 grams of acrylic acid, and 9.5 grams of 1-dodecanethiol) with an aqueous solution (6.6 grams of DOWFAX 3B2™, 3.0 grams of ANTAROX CA-897™, and 251 grams of deionized water) at 10,000 rpm for 5 minutes at room temperature of about 25° C. via VirTishear Cyclone Homogenizer. One hundred and sixty-five (165) grams of seed were taken from the monomer emulsion and added into the flask and were stirred for 5 minutes at 80° C. An initiator solution prepared from 8.1 grams of ammonium persulfate in 40 grams of deionized water was added over 20 minutes. Stirring continued for an additional 20 minutes to allow seed particle formation. The remaining 661 grams of monomer emulsion were fed continuously into the reactor over 4 hours and 5 minutes. The nitrogen purge was reduced to a slow trickle to maintain a small positive pressure. After monomer emulsion addition was completed, the reaction was allowed to post react for 90 minutes at 80° C. No strong exotherm was observed throughout the reaction when this in situ seeded, monomer emulsion fed process was implemented. Only a very mild exotherm of about 0.6° C. was observed during the initial seed formation stage. The resulting latex polymer possessed an $M_w$ of 23,600, an $M_n$ of 7,200, as determined on a Waters GPC, and a mid-point Tg of 61.8° C., as measured on a Seiko DSC. The latex resin possessed a volume average diameter of 202 nanometers as measured by light scattering technique on a Coulter N4 Plus Particle Sizer.

No sediment was observed after the latex was allowed to stand for two full weeks. The amount of sediment determined via an IEC Centrifuge at 3,120 G-force for 50 seconds was less than 0.05 weight percent of the latex after two weeks.

260.0 Grams of the above prepared latex emulsion and 220.0 grams of an aqueous cyan pigment dispersion containing 7.6 grams of Cyan Pigment 15:3, and 2.3 grams of cationic surfactant SANIZOL B-50™ were simultaneously added to 400 milliliters of water with high shear stirring at 7,000 rpm for 3 minutes by means of a polytron. The resulting mixture was then transferred to a 2 liter reaction vessel and heated at a temperature of 55° C. for 1.5 hours before 26 milliliters of 20 percent aqueous BIOSOFT D-40™ solution were added. Aggregates with a particle size (volume average diameter) of 6.5 microns with a GSD=1.17, as measured on the Coulter Counter, were obtained. Subsequently, the mixture was heated to 93° C. and held there for a period of 2.5 hours before cooling down to room temperature, about 25° C. throughout, filtered, washed with water, and dried in a freeze dryer. The final toner product evidenced a particle size of 6.9 micron in volume average diameter with a particle size distribution of 1.19 as measured on a Coulter Counter.

The resulting toner, that is the above final toner product, was comprised of about 93 percent of polymer, poly (styrene-butyl acrylate-acrylic acid), and Cyan Pigment 15:3, about 7 percent by weight of toner, with an volume average diameter of 6.9 microns and a GSD of 1.19, indicating that one can retain toner particle size and GSD achieved in the aggregation step during coalescence without the aggregates falling apart, or separating and without an excessive increase in particle size, when a sediment free emulsion polymer was prepared by the above semicontinuous emulsion polymerization process by adding a surfactant of sodium n-decyl diphenyloxide disulfonate to, for example, enhance the latex stability.

19

EXAMPLE V

A latex was prepared by semicontinuous emulsion polymerization of styrene/butyl acrylate/acrylic acid, 71/29/3 parts (by weight), using a diphenyloxide disulfonate surfactant as follows. A 2 liter jacketed glass flask with a stirrer set at 200 rpm, and containing 17.1 grams of DOWFAX 8390™ (sodium n-hexadecyl diphenyloxide disulfonate, 35 percent active, available from Dow Chemical), 6.0 grams of ANTAROX CA 897™ (70 percent active), and 519 grams of deionized water was purged with nitrogen for 30 minutes while the temperature was from about 25° C. to about 80° C. A monomer emulsion was prepared by homogenizing a monomer mixture (383 grams of styrene, 157 grams of n-butyl acrylate, 16.2 grams of acrylic acid, and 5.4 grams of 1-dodecanethiol) with an aqueous solution (8.5 grams of DOWFAX 8390™, 3.0 grams of ANTAROX CA-897™, and 251 grams of deionized water) at 500 rpm for 25 minutes at room temperature of about 25° C. via Cole-Parmer Servodyne Mixer. Forty-one (41) grams of seed was taken from the monomer emulsion and added into the flask, and were stirred for 5 minutes at 80° C. An initiator solution prepared from 8.1 grams of ammonium persulfate in 40 grams of deionized water was added over 20 minutes. Stirring continued for an additional 20 minutes to allow seed particle formation. The remaining 783 grams of monomer emulsion were fed continuously into the reactor over 4 hours and 20 minutes. The nitrogen purge was reduced to a slow trickle to maintain a small positive pressure. After monomer emulsion addition was completed, the reaction was allowed to post react for 90 minutes at 80° C. No strong exotherm was observed throughout the reaction when this in situ seeded, monomer emulsion fed process was implemented. Only a very mild exotherm of about 0.3° C. was observed during the initial seed formation stage. The resulting latex polymer possessed an $M_w$, of 36,000, an $M_n$ of 10,300, as determined on a Waters GPC, and a mid-point Tg of 51.4° C., as measured on a Seiko DSC. The latex resin possessed a volume average diameter of 195 nanometers as measured by light scattering technique on a Coulter N4 Plus Particle Sizer.

No sediment was observed after the latex was allowed to stand for two full weeks. The amount of sediment determined via an IEC Centrifuge at 3,120 G-force for 50 seconds was less than 0.1 weight percent of the latex after two weeks.

260.0 Grams of the above prepared latex emulsion and 220.0 grams of an aqueous cyan pigment dispersion containing 7.6 grams of Cyan Pigment 15:3, and 2.3 grams of cationic surfactant SANIZOL B-50™ were simultaneously added to 400 milliliters of water with high shear stirring at 7,000 rpm for 3 minutes by means of a polytron. The resulting mixture was then transferred to a 2 liter reaction vessel and heated at a temperature of 46° C. for 1.5 hours before 30 milliliters of 20 percent aqueous BIOSOFT D-40™ solution were added. Aggregates with a particle size (volume average diameter) of 7.9 microns with a GSD=1.16, as measured on the Coulter Counter, were obtained. Subsequently, the mixture was heated to 93° C. and held there for a period of 3 hours before cooling down to room temperature, about 25° C. throughout, filtered, washed with water, and dried in a freeze dryer. The final toner product evidenced a particle size of 8.2 microns in volume average diameter with a particle size distribution of 1.17 as measured on a Coulter Counter.

The resulting toner, that is the above final toner product, was comprised of about 93 percent of polymer, poly (styrene-butyl acrylate-acrylic acid), and Cyan Pigment 15:3, about 7 percent by weight of toner, with a volume average diameter of 8.2 microns and a GSD of 1.17, indicating that toner particle size and GSD achieved in the aggregation step can be retained during coalescence without the aggregates falling apart, or separating and without an excessive increase in particle size, when a sediment free emulsion was polymer prepared via the above semicontinuous emulsion polymerization process by adding a surfactant of sodium n-hexadecyl diphenyloxide disulfonate to, for example, enhance the latex stability.

EXAMPLE VI

A latex was prepared by semicontinuous emulsion polymerization of styrene/butyl acrylate/acrylic acid, 78/22/2 parts (by weight), using a diphenyloxide disulfonate surfactant as follows. A 2 liter jacketed glass flask with a stirrer set at 200 rpm, and containing 8.8 grams of DOWFAX 2A1™ (47 percent active), 6.0 grams of ANTAROX CA 897™ (70 percent active), and 519 grams of deionized water was purged with nitrogen for 30 minutes while the temperature was from about 25° C. to about 80° C. A monomer emulsion was prepared by homogenizing a monomer mixture (421 grams of styrene, 119 grams of n-butyl acrylate, 10.8 grams of acrylic acid, 3.2 grams of 1-dodecanethiol, and 5.4 grams of carbon tetrabromide) with an aqueous solution (4.4 grams of DOWFAX 2A1™, 3.0 grams of ANTAROX CA-897™, and 251 grams of deionized water) at 10,000 rpm for 5 minutes at room temperature of about 25° C. via VirTishear Cyclone Homogenizer. Forty-one (41) grams of seed were taken from the monomer emulsion and added into the flask and were stirred for 5 minutes at 80° C. An initiator solution prepared from 8.1 grams of ammonium persulfate in 40 grams of deionized water was added over 20 minutes. Stirring continued for an additional 20 minutes to allow seed particle formation. The remaining 777 grams of monomer emulsion were fed continuously into the reactor over 4 hours and 17 minutes. The nitrogen purge was reduced to a slow trickle to maintain a small positive pressure. After monomer emulsion addition was completed, the reaction was allowed to post react for 90 minutes at 80° C. No strong exotherm was observed throughout the reaction when this in situ seeded, monomer emulsion fed process was implemented. Only a very mild exotherm of about 0.3° C. was observed during the initial seed formation stage. The resulting latex polymer possessed an $M_w$, of 30,000, an $M_n$ of 7,400, as determined on a Waters GPC, and a mid-point Tg of 57.5° C., as measured on a Seiko DSC. The latex resin possessed a volume average diameter of 225 nanometers as measured by light scattering technique on a Coulter N4 Plus Particle Sizer.

No sediment was observed after the latex was allowed to stand for two full weeks. The amount of sediment determined via an IEC Centrifuge at 3,120 G-force for 50 seconds was less than 0.1 weight percent of the latex after two weeks.

260.0 Grams of the above prepared latex emulsion and 220.0 grams of an aqueous cyan pigment dispersion containing 7.6 grams of Cyan Pigment 15.3, and 2.3 grams of cationic surfactant SANIZOL B-50™ were simultaneously added to 400 milliliters of water with high shear stirring at 7,000 rpm for 3 minutes by means of a polytron. The resulting mixture was then transferred to a 2 liter reaction vessel and heated at a temperature of 51° C. for 4 hours before 26 milliliters of 20 percent aqueous BIOSOFT D-40™ solution were added. Aggregates with a particle size (volume average diameter) of 7.8 microns with a GSD=1.24, as measured on the Coulter Counter, were obtained. Subsequently, the mixture was heated to 93° C. and held there for a period of 2.5 hours before cooling down to room temperature, about 25° C. throughout, filtered, washed with water, and dried in a freeze dryer. The final toner product evidenced a particle size of 7.9 microns in volume average diameter with a particle size distribution of 1.26 as measured on a Coulter Counter.

The resulting toner, that is the above final toner product, was comprised of about 93 percent of polymer, poly (styrene-butyl acrylate-acrylic acid), and Cyan Pigment 15:3, about 7 percent by weight of toner, with a volume average diameter of 7.9 microns and a GSD of 1.26, indicating that one can retain toner particle size and GSD achieved in the aggregation step during coalescence without the aggregates falling apart, or separating and without an excessive increase in particle size, when a sediment free emulsion polymer was prepared via the above semicontinuous emulsion polymerization process by adding a surfactant of sodium tetrapropyl diphenyloxide disulfonate to, for example, enhance the latex stability.

EXAMPLE VII
Process Reproducibility

Four batches of latex were prepared by semicontinuous emulsion polymerization of styrene/butyl acrylate/acrylic acid, 75/25/3 parts (by weight), using a diphenyloxide disulfonate surfactant as follows. In a 2 liter jacketed glass flask with a stirrer set at 200 rpm, and containing 8.8 grams of DOWFAX 2A1™ (47 percent active), 6.0 grams of ANTAROX CA 897™ (70 percent active), and 519 grams of deionized water was purged with nitrogen for 30 minutes while the temperature was from about 25° C. to about 80° C. A monomer emulsion was prepared by homogenizing a monomer mixture (405 grams of styrene, 135 grams of n-butyl acrylate, 16.2 grams of acrylic acid, and 8.1 grams of 1-dodecanethiol) with an aqueous solution (4.4 grams of DOWFAX 2A1™, 3.0 grams of ANTAROX CA-897™, and 251 grams of deionized water) at 10,000 rpm for 5 minutes at room temperature of about 25° C. via VirTishear Cyclone Homogenizer. Forty-one (41) grams of seed were taken from the monomer emulsion and added into the flask and were stirred for 5 minutes at 80° C. An initiator solution prepared from 8.1 grams of ammonium persulfate in 40 grams of deionized water was added over 20 minutes. Stirring continued for an additional 20 minutes to allow seed particle formation. The remaining 782 grams of monomer emulsion were fed continuously into the reactor over 4 hours and 25 minutes. The nitrogen purge was reduced to a slow trickle to maintain a small positive pressure. After monomer emulsion addition was completed, the reaction was allowed to post react for 90 minutes at 80° C. No strong exotherm was observed throughout the reaction when this in situ seeded, monomer emulsion fed process was implemented. Only a very mild exotherm of about 0.3° C. was observed during the initial seed formation stage. Characterization of the resulting four batches of latex are shown in the following table.

TABLE 1

Properties of Latex Prepared via the Semicontinuous Emulsion Polymerization Process Using Diphenyloxide Disulfonate Emulsifier

| Batch No. | Latex Diameter (nm) | Tg °C. | $M_w$ | $M_n$ |
|---|---|---|---|---|
| 1 | 175 | 53.5 | 28,000 | 9,100 |
| 2 | 183 | 52.8 | 27,000 | 7,200 |

TABLE 1-continued

Properties of Latex Prepared via the Semicontinuous Emulsion Polymerization Process Using Diphenyloxide Disulfonate Emulsifier

| Batch No. | Latex Diameter (nm) | Tg °C. | $M_w$ | $M_n$ |
|---|---|---|---|---|
| 3 | 179 | 52.4 | 27,000 | 7,400 |
| 4 | 189 | 53.7 | 27,000 | 8,600 |

Table 1 illustrates a polymer latex volume average diameter of 182 nanometers as measured by light scattering technique on a Coulter N4 Plus Particle Sizer, latex polymer average, molecular weights of $M_w$=27,300 and $M_n$=8,100 as determined on a Waters GPC, and an average mid-point Tg of 53.1° C., as measured on a Seiko DSC.

No sediment was observed after the aftermentioned four batches of latex were allowed to stand for two full weeks. The amount of sediment determined via an IEC Centrifuge at 3,120 G-force for 50 seconds was less than 0.1 weight percent of the latex after two weeks.

Four batches of toners were prepared using the above prepared four batches as follows. 260.0 Grams of the latex emulsion and 220.0 grams of an aqueous cyan pigment dispersion containing 7.6 grams of Cyan Pigment 15:3, and 2.3 grams of cationic surfactant SANIZOL B-50™ were simultaneously added to 400 milliliters of water with high shear stirring at 7,000 rpm for 3 minutes by means of a polytron. The resulting mixture was then transferred to a 2 liter reaction vessel and heated at a temperature of 48° C. for 1.5 hours before 40 milliliters of 20 percent aqueous BIO-SOFT D-40™ solution were added. Subsequently, the mixture was heated to 93° C. and held there for a period of 2.5 hours before cooling down to room temperature, about 25° C. throughout, filtered, washed with water, and dried in a freeze dryer. The above aggregation and coalescence were used for each batch of latex to prepare four batches of toner. The particle size of each batch of the final toner product was measured on a Coulter Counter. Results are shown in Table 2, where $d_{50}$ is the volume average diameter of toner particles.

TABLE 2

Properties of Toners Prepared Using the Latexes Prepared via the Semicontinuous Emulsion Polymerization Process Using Diphenyloxide Disulfonate Emulsifier

| Batch No. | $d_{50}$ (micron) | GSD |
|---|---|---|
| 1 | 7.4 | 1.19 |
| 2 | 7.4 | 1.22 |
| 3 | 7.0 | 1.21 |
| 4 | 7.5 | 1.20 |

The resulting four batches of toner products were comprised of about 93 percent of polymer, poly(styrene-butyl acrylate-acrylic acid), and Cyan Pigment 15:3, about 7 percent by weight of toner, with a volume average diameter of 7.3 microns and an average GSD of 1.21, indicating, for example, the reproducibility of processes of the present invention.

EXAMPLE VIII

A latex emulsion was prepared by the semicontinuous miniemulsion polymerization of styrene/butyl acrylate/acrylic acid, 75/25/3 parts (by weight), using a diphenyloxide disulfonate surfactant as follows. A 2 liter jacketed glass flask with a stirrer set at 200 rpm, and containing 8.8 grams of DOWFAX 2A1™ (47 percent active), and 519 grams of deionized water was purged with nitrogen for 30 minutes while the temperature was from about 25° C. to about 80° C. A monomer emulsion was prepared by homogenizing a monomer mixture (405 grams of styrene, 135 grams of n-butyl acrylate, 16.2 grams of acrylic acid, 8.1 grams of 1-dodecanethiol, and 4.9 grams of hexadecane as the cosurfactant) with an aqueous solution (4.4 grams of DOWFAX 2A1™ and 251 grams of deionized water) at 10,000 rpm for 5 minutes at room temperature of about 25° C. via VirTishear Cyclone Homogenizer. Forty-one (41) grams of seed were taken from the monomer emulsion and added into the flask, and the flask contents were stirred for 5 minutes at 80° C. An initiator solution prepared from 8.1 grams of ammonium persulfate in 40 grams of deionized water was added over 20 minutes. Stirring continued for an additional 20 minutes to allow seed particle formation. The remaining 783 grams of monomer emulsion were fed continuously into the reactor over 4 hours and 34 minutes. The nitrogen purge was reduced to a slow trickle to maintain a small positive pressure. After monomer emulsion addition was completed, the reaction was allowed to post react for 90 minutes at 80° C. No strong exotherm was observed throughout the reaction when this in situ seeded, monomer emulsion fed process was implemented. Only a very mild exotherm of about 0.3° C. was observed during the initial seed formation stage. The resulting latex polymer possessed an $M_w$ of 29,000, an $M_n$ of 8,900, as determined on a Waters GPC, and a mid-point Tg of 53.5° C., as measured on a Seiko DSC. The latex resin possessed a volume average diameter of 197 nanometers as measured by light scattering technique on a Coulter N4 Plus Particle Sizer.

No sediment was observed after the latex was allowed to stand for two full weeks. The amount of sediment determined via an IEC Centrifuge at 3,120 G-force for 50 seconds was less than 0.1 weight percent of the latex after two weeks.

260.0 Grams of the above prepared latex emulsion and 220.0 grams of an aqueous cyan pigment dispersion containing 7.6 grams of Cyan Pigment 15:3, and 2.3 grams of cationic surfactant SANIZOL B-50™ were simultaneously added to 400 milliliters of water with high shear stirring at 7,000 rpm for 3 minutes by means of a polytron. The resulting mixture was then transferred to a 2 liter reaction vessel and heated at a temperature of 48° C. for 2 hours before 26 milliliters of 20 percent aqueous BIOSOFT D-40™ solution were added. Aggregates with a particle size (volume average diameter) of 6.6 microns with a GSD=1.17, as measured on the Coulter Counter, were obtained. Subsequently, the mixture was heated to 93° C. and held there for a period of 2.5 hours before cooling down to room temperature, about 25° C. throughout, filtered, washed with water, and dried in a freeze dryer. The final toner product evidenced a particle size of 7.0 microns in volume average diameter with a particle size distribution of 1.19 as measured on a Coulter Counter.

The resulting toner, that is the above final toner product, was comprised of about 93 percent of polymer, poly (styrene-butyl acrylate-acrylic acid), and Cyan Pigment 15:3, about 7 percent by weight of toner, with a volume average diameter of 7.0 microns and a GSD of 1.19, indicating that one can retain toner particle size and GSD achieved in the aggregation step during coalescence without the aggregates falling apart, or separating and without an excessive increase in particle size, when a sediment free emulsion polymer was prepared by the above semicontinuous miniemulsion polymerization process by adding a surfactant of sodium tetrapropyl diphenyloxide disulfonate and a cosurfactant of hexadecane to, for example, enhance the latex stability.

EXAMPLE IX

A latex was prepared by semicontinuous emulsion polymerization of styrene/butyl acrylate/acrylic acid, 73/27/3 parts (by weight), using a diphenyloxide disulfonate surfactant as follows. A 2 liter jacketed glass flask with a stirrer set at 200 rpm, and containing 8.8 grams of DOWFAX 2A1™ (47 percent active), 6.0 grams of ANTAROX CA 897™ (70 percent active), and 519 grams of deionized water was purged with nitrogen for 30 minutes while the temperature was from about 25° C. to about 80° C. A monomer emulsion was prepared by homogenizing a monomer mixture (394 grams of styrene, 146 grams of n-butyl acrylate, and 16.2 grams of acrylic acid) with an aqueous solution (4.4 grams of DOWFAX 2A1™, 3.0 grams of ANTAROX CA-897™, and 251 grams of deionized water) at 10,000 rpm for 5 minutes at room temperature of about 25° C. via VirTishear Cyclone Homogenizer. Forty-one (41) grams of seed were taken from the monomer emulsion and added into the flask and were stirred for 5 minutes at 80° C. An initiator solution prepared from 1.6 grams of ammonium persulfate in 40 grams of deionized water was added over 20 minutes. Stirring continued for an additional 20 minutes to allow seed particle formation. The remaining 774 grams of monomer emulsion were fed continuously into the reactor over 4 hours and 18 minutes. The nitrogen purge was reduced to a slow trickle to maintain a small positive pressure. After monomer emulsion addition was completed, the reaction was allowed to post react for 90 minutes at 80° C. No strong exotherm was observed throughout the reaction when this in situ seeded, monomer emulsion fed process was implemented. Only a very mild exotherm of about 0.3° C. was observed during the initial seed formation stage. The resulting latex polymer possessed an $M_w$ of 574,000, an $M_n$ of 30,100, as determined on a Waters GPC, and a mid-point Tg of 61.0° C., as measured on a Seiko DSC. The latex resin possessed a volume average diameter of 123 nanometers as measured by light scattering technique on a Coulter N4 Plus Particle Sizer.

No sediment was observed after the latex was allowed to stand for two full weeks. The amount of sediment determined via an IEC Centrifuge at 3,120 G-force for 50 seconds was less than 0.1 weight percent of the latex after two weeks.

COMPARATIVE EXAMPLE IB

A latex was prepared by semicontinuous emulsion polymerization of styrene/butyl acrylate/acrylic acid, 75/25/3 parts (by weight), using a sodium dodecylbenzene sulfonate surfactant as follows. A 2 liter jacketed glass flask with a stirrer set at 200 rpm, 25.5 grams of NEOGEN R™ (sodium dodecylbenzene sulfonate, 20 percent active, available from Kao), 7.7 grams of ANTAROX CA 897™ (70 percent active), and 519 grams of deionized water was purged with nitrogen for 30 minutes while the temperature was from about 25° C. to about 80° C. A monomer emulsion was prepared by homogenizing a monomer mixture (405 grams of styrene, 135 grams of n-butyl acrylate, 16.2 grams of acrylic acid, and 13.5 grams of 1-dodecanethiol) with an aqueous solution (12.8 grams of NEOGEN R™, 3.9 grams of ANTAROX CA-897™, and 251 grams of deionized water) at 10,000 rpm for 5 minutes at room temperature of about 25° C. via VirTishear Cyclone Homogenizer. Forty-one (41) grams of seed were taken from the monomer emulsion and added into the flask, and was stirred for 5 minutes at 80° C. An initiator solution prepared from 8.1 grams of ammonium persulfate in 40 grams of deionized water was added over 20 minutes. Stirring continued for an additional 20 minutes to allow seed particle formation. The remaining 796 grams of monomer emulsion were fed continuously into the reactor over 4 hours and 3 minutes. The nitrogen purge was reduced to a slow trickle to maintain a small positive pressure. After monomer emulsion addition was completed, the reaction was allowed to post react for 90 minutes at 80° C. No strong exotherm was observed throughout the reaction when this in situ seeded, monomer emulsion fed process was implemented. Only a very mild exotherm of about 0.3° C. was observed during the initial seed formation stage. The resulting latex polymer possessed an $M_w$ of 21,500, an $M_n$ of 5,700, as determined on a Waters GPC, and a mid-point Tg of 53.4° C., as measured on a Seiko DSC. The latex resin possessed a volume average diameter of 167 nanometers as measured by light scattering technique on a Coulter N4 Plus Particle Sizer.

Sediment containing low $M_w$ and low Tg polymer particles was observed after the latex was allowed to stand for two days. The amount of sediment determined via an IEC Centrifuge at 3,120 G-force for 50 seconds was less about 3.4 weight percent of the prepared latex, which contained undesirable polymer particles with low $M_w$=14,900 and a low glass transition temperature of 25° C. This undesirable portion, about 3.4 weight percent of the latex, can be removed from the remainder of the latex by a known sedimentation technique. A sediment is a latex containing undesirable polymer particles with a large particle size, low molecular weight and low Tg. An emulsion product containing some sediment is not as suitable both for the aggregation/coalescence processes and for generating toner compositions. A sediment can cause the aggregates to have a greater propensity to fall apart or an excessive increase in particle size, as evidenced by the final toner particle size and GSD. Therefore, the sediment is usually removed prior to the aggregation/coalescence to retain toner particle size with a narrow GSD. Sediment generated during the emulsion polymerization can result in lower production yield, the need for waste disposal, and a need for additional capital investment for sediment removal equipment such as a centrifuge.

In this Comparative Example, the undesirable polymer particles were not removed to permit the comparison of the results of this Comparative Example with Examples I to VI. 260.0 Grams of the above prepared latex emulsion and 220.0 grams of an aqueous cyan pigment dispersion containing 7.6 grams of Cyan Pigment 15:3, and 2.3 grams of cationic surfactant SANIZOL B-50™ were simultaneously added to 400 milliliters of water with high shear stirring at 7,000 rpm for 3 minutes by means of a polytron. The resulting mixture was then transferred to a 2 liter reaction vessel and heated at a temperature of 48° C. for 2.5 hours before 40 milliliters of 20 percent aqueous NEOGEN R™ solution were added. Aggregates with a particle size (volume average diameter) of 6.7 microns with a GSD=1.22, as measured on the Coulter Counter, were obtained. Subsequently, the mixture was heated to 90° C. and held there for a period of 3 hours before cooling down to room temperature, about 25° C. throughout, filtered, washed with water, and dried in a freeze dryer. The final toner product evidenced a particle size of 8.5 microns in volume average diameter with a particle size distribution of 1.35 as measured on a Coulter Counter.

The results in Examples I to VI indicate that the semicontinuous process enhanced the latex stability during emulsion polymerization and minimizes/eliminates the amount of sediment, that is the undesirable polymer particles, prepared during emulsion polymerization. An emulsion product containing sediment having undesirable properties is not as suitable both for aggregation/coalescence processes and for generating a toner composition. Sediment in an emulsion causes the aggregates to fall apart or grow substantially, as demonstrated by this Comparative Example. As demonstrated by the above Examples I to VI, the use of the semicontinuous emulsion polymerization with a diphenyloxide disulfonate surfactant increases the latex stability and yields latexes with no sediment.

Other modifications of the present invention will occur to those of ordinary skill in the art subsequent to a review of the present application. These modifications and equivalents, or substantial equivalents thereof are intended to be included within the scope of the present invention.

What is claimed is:

1. A process for the preparation of toner
   (i) providing an initial liquid composition comprising water, from about 10 to about 95 percent by weight, and diphenyloxide disulfonate, from about 50 to about 95 percent by weight;
   (ii) conducting a pre-reaction monomer emulsification which comprises emulsification of the polymerization reagents of monomer, chain transfer agent, said composition of (i), and an optional initiator, and wherein said emulsification is accomplished at a low temperature, from about 5 C. to about 40 C.;
   (iii) preparing a seed particle latex by aqueous emulsion polymerization of a mixture comprised of part of said monomer emulsion of (ii), from about 0.5 to about 50 percent by weight, and an free radical initiator, from about 0.5 to about 100 percent by weight, at a temperature of from about 35 C. to about 125 C., wherein the reaction of the free radical initiator and monomer produces a seed resin latex;
   (iv) heating and feed adding to the seed particles the remaining monomer emulsion of (ii), from about 50 to about 99.5 percent by weight, and an optional free radical initiator, from about 0 to about 99.5 percent by weight, at a temperature of from about 35 C. to about 125 C.; and
   (v) retaining the above contents in the reactor at the temperature of from about 35 C. to about 125 C., followed by cooling;
   (vi) aggregating a colorant dispersion with the contents of (v);
   (vii) coalescing or fusing the aggregates generated; and optionally
   (viii) isolating, washing, and drying the toner.

2. A process in accordance with claim 1 wherein said aggregating is below about the latex polymer glass transition temperature present in the latex emulsion, the coalescing or fusing of said aggregates is above about the polymer glass transition temperature, and there results toner with a size of from about 2 to about 20 microns in volume average diameter.

3. A process in accordance with claim 2 wherein said temperature below the glass transition temperature is from about 25° C. to about 60° C., and the heating above the glass transition temperature is from about 60° C. to about 100° C.

4. A process in accordance with claim 2 wherein said temperature below the glass transition temperature is from about 35° C. to about 55° C., and the heating above the glass transition temperature is from about 70° C. to about 95° C.

5. A process in accordance with claim 2 wherein the temperature at which said aggregation is accomplished controls the size of the aggregates, and wherein the final toner size is from about 2 to about 10 microns in volume average diameter, and wherein the temperature and time of said coalescence or fusing of the components of aggregates control the shape of the resultant toner.

6. A process in accordance with claim 2 wherein the aggregation temperature is from about 45° C. to about 55° C., and wherein the coalescence or fusing temperature is from about 80° C. to about 95° C.

7. A process in accordance with claim 1 wherein there is further selected a cosurfactant selected from the group consisting of alkanes, hydrocarbyl alcohols, ethers, amines, halides, and esters.

8. A process in accordance with claim 1 wherein the colorant is a pigment, and wherein said pigment dispersion contains an ionic surfactant.

9. A process in accordance with claim 1 wherein there is further included a surfactant in the colorant and which surfactant is a cationic surfactant.

10. A process in accordance with claim 1 wherein the aggregating is conducted at a temperature of about 15° C. to about 1° C. below the Tg of the latex polymer, or latex resin for a duration of from about 0.5 hour to about 3 hours; and wherein the coalescence or fusing of the components of aggregates for the formation of integral toner particles comprised of colorant, resin and additives is accomplished at a temperature of about 85° C. to about 105° C. for a duration of from about 1 hour to about 5 hours.

11. A process in accordance with claim 1 wherein the colorant is carbon black, cyan, yellow, magenta, and mixtures thereof.

12. A process in accordance with claim 1 wherein the toner particles isolated are from about 2 to about 10 microns in volume average diameter, and the particle size distribution thereof is from about 1.15 to about 1.30, and wherein there is added to the surface of the formed toner metal salts, metal salts of fatty acids, silicas, metal oxides, or mixtures thereof, each in an amount of from about 0.1 to about 10 weight percent of the obtained toner particles.

* * * * *